Jan. 1, 1946.　　　　M. L. MAGES　　　2,392,168
MEANS FOR MAGNETIC INSPECTION
Filed May 3, 1943
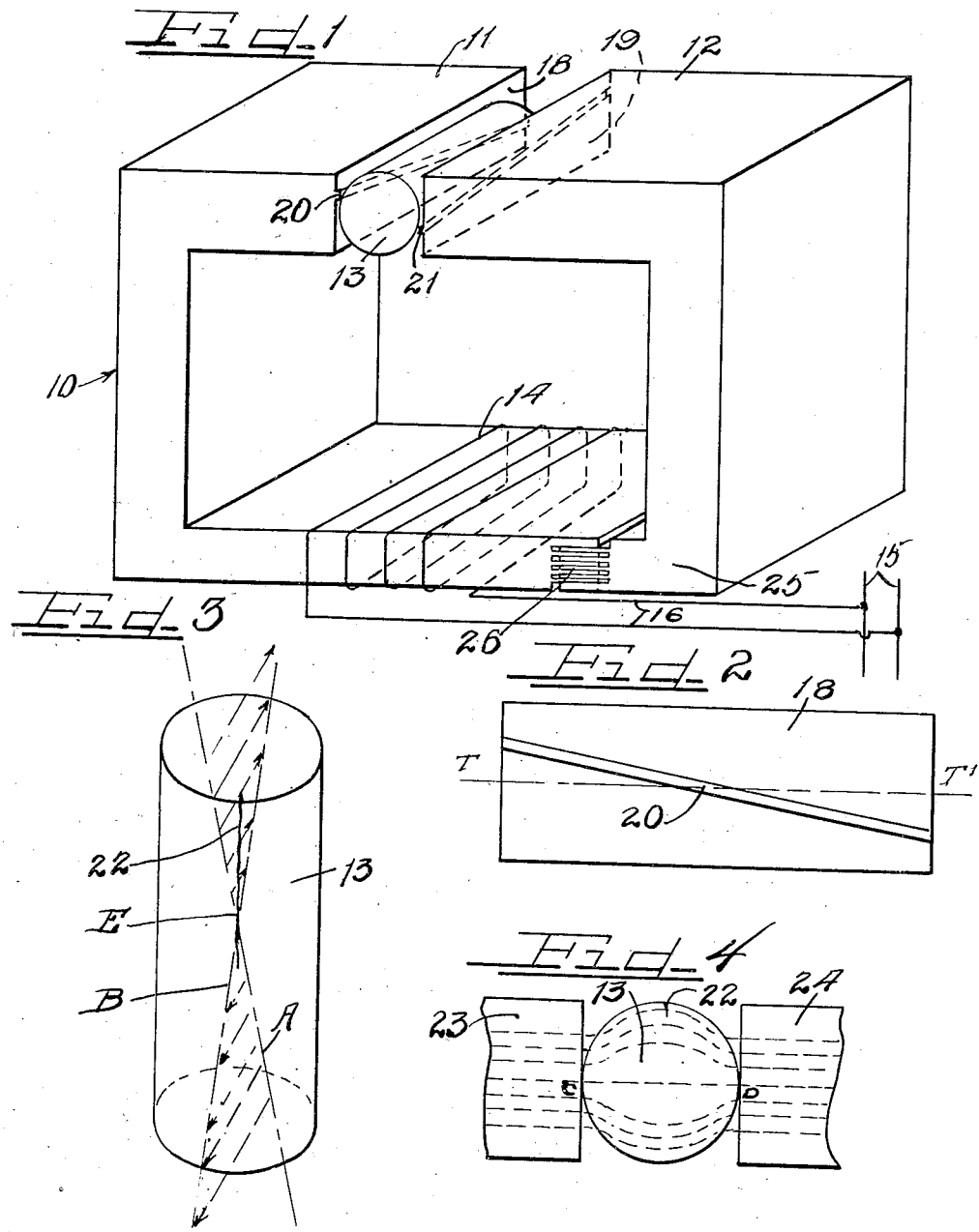
Inventor
Morris L. Mages.
By Charles W. Hills Attys.

Patented Jan. 1, 1946

2,392,168

UNITED STATES PATENT OFFICE 2,392,168

MEANS FOR MAGNETIC INSPECTION

Morris L. Mages, Chicago, Ill., assignor to Magnaflux Corporation, Chicago, Ill., a corporation of Delaware Application May 3, 1943, Serial No. 485,444

4 Claims. (Cl. 175—21)

This invention relates to a method and means for magnetic inspection, and more particularly to a novel method and means for magnetizing a magnetizable metal object to be tested for flaws and other defects.

A number of years ago it was determined that if a steel part were magnetized and paramagnetic particles were distributed over the surface of the part, these particles would be more densely grouped over any minute crack or sub-surface defect due to the leakage flux present around such defect. This congregation of paramagnetic particles over a defect provides an indication of the presence of the same and thus provides an easy method of checking each and every manufactured part to determine whether or not such part is defective. The reliability of such tests depend of course upon the establishment of a leakage flux around any defect. Such a flux is obtained if the article is placed in a magnetic field in such a manner that the lines of force intersect the longitudinal axis of the crack. It has been found in practice that defects usually occur with their longitudinal axis either substantially parallel to the longitudinal axis of the part being tested, or else transverse thereto. It has been the common practice in the past to test for longitudinal defects by passing a current axially along the part being tested, while a coil has been employed to locate transverse defects. The method of passing current through the part for locating longitudinal defects gives excellent results and as a whole is more useful commercially than the coil system. The reason for this is that the flux completes its path entirely through the iron and it is therefore possible to produce a very intense magnetization of the part. There are, however, a number of disadvantages to this method which often makes it difficult or impossible to employ in connection with all parts. For example, there is danger of burning the part at the contact point because of high currents used. Also, very small parts are difficult to handle between contact heads and it requires a more or less complicated mechanism to obtain proper handling facilities. For this reason a coil system would be advantageous to locate longitudinal defects.

It is an object of the present invention to provide a novel method and means for testing for longitudinal defects in a magnetizable metal part by subjecting the part solely to the influence of a magnetic field and without passing current directly through the part.

It is a further object of the present invention to provide a novel method and means for transversely magnetizing a magnetizable metal object.

Another object of the present invention is to provide a novel yoke construction and magnetizing coil for magnetizing magnetizable objections.

A still further object of the present invention is to provide a novel method and means for magnetizing uniformly shaped metal articles by concentrating the magnetic field along a line at a slight angle to the longitudinal axis of the article.

Another still further object of the present invention is to provide a magnetizing yoke having novel pole faces.

The novel features which I believe to be characteristic of my invention are set forth with particularity in the appended claims. My invention itself, however, both as to its organization, manner of construction, and methods of operation, together with further objects and advantages thereof, may best be understood by reference to the following description, taken in connection with the accompanying drawing, in which:

Figure 1 is a diagrammatic illustration of one embodiment of the present invention illustrating a magnetizing yoke with an article to be tested held between its pole faces;

Figure 2 is a view of one of the pole faces;

Figure 3 is a diagrammatic illustration of the object to be tested showing a longitudinal defect in the surface thereof and indicating the area of greatest field concentration; and Figure 4 is a flux diagram transversely through the article being tested.

Referring now to Figures 1 and 2, there is illustrated therein an iron yoke member 10 having pole pieces 11 and 12 between which a magnetizable article 13 to be tested is held. A magnetizing coil 14 energized from a suitable supply line 15 through conductors 16 and switch 17 is wound around the yoke 10.

On the pole faces 18 and 19 of the pole pieces 11 and 12 respectively are yoke extensions 20 and 21 respectively. These yoke extensions 20 and 21 are in the form of raised ribs which are disclosed at a slight angle to the horizontal transverse axis T—T' of the pole faces. By way of example and not by way of limitation, the yoke extensions may be disposed at an angle of approximately 10° with respect to the horizontal transverse axis T. The yoke extension 20 on the pole face 18 starts at a point above the medium plane of the pole face on the near side as viewed in Figure 1 and extends obliquely downwardly across the medium plane to the rear side. The yoke extension 21 starts at a point below the medium plane of the pole face 19 on the near side, as viewed in Figure 1, and extends obliquely upwardly across the medium plane to the rear side. Thus it is to be understood that the yoke extensions 20 and 21 are not parallel to each other. When the yoke extensions 20 and 21 are disposed at an angle of 10° with respect to the horizontal transverse axis of their respective pole faces, they will then be disposed at an angle of 20° with respect to each other.

The reason for providing yoke extensions and for disposing them at a slight angle with respect to the transverse horizontal axes of their respective pole faces will now be explained. The flux path between the pole faces 18 and 19 is, of course, substantially transverse to the longitudinal axis of the article 13, which in this case has been illustrated as a roller bearing. Let us assume that the article 13 has a longitudinal defect 22 along the surface thereof. If this article 13 were held between a conventional pair of pole pieces 23 and 24, as diagrammatically illustrated in Figure 4, with the defect 22 in the position shown, a strong leakage flux will be provided at the point where the defect 22 occurs. It will be observed, however, that if the article 13 had been placed between the pole pieces 23 and 24 with the defect at either the point C or D, the line of flux would not be intersecting the defect 22. We thus have a "blind spot" at both the point C and the point D.

Since the purpose of magnetizing the metal article and then depositing paramagnetic particles over the surface thereof is for the purpose of locating defects which are so minute as not to be visible to the human eye, it is obvious that the person examining the piece would not be able to know whether the article had a defect at either of the blind spots C or D unless some means was provided to eliminate the blind spots or unless the person tested the piece first in one position and then rotated the part to approximately 90° about its longitudinal axis and retested.

By providing ribs or yoke extensions on the pole faces of the yoke which are disposed at a slight angle to the transverse horizontal axis of the pole piece and at an angle with respect to each other, the blind spot is eliminated and as a result the need for a second test is eliminated. The reason for this will be apparent from the structure of Figure 3. In this figure the broken lines A and B indicate the relative angular position of the yoke extensions 20 and 21 on opposite sides of the article 13. The lines of flux passing between the yoke extensions 20 and 21 from their respective positions, as indicated by the letters A and D, thus are caused to intersect a longitudinal defect 22 even though that longitudinal defect now instead of having a blind spot which might extend the entire length of the defect 22, the only possible blind spot is at the point where the line A intersects the defect 22 as indicated by the letter E.

From the above discussion it will be apparent that the blind spot is the region where a pole face engages the article. By confining and controlling this region to a very small area through the use of a yoke extension or narrow rib, the extent of the blind region is very substantially reduced. By further disposing this yoke extension at an angle to the longitudinal axis of the piece to be tested the possibility of failing to locate a defect is still further reduced, since it is to be remembered that substantially all defects are either longitudinal defects or transverse defects.

The yoke 10 may be constructed, if desired, in such a manner that the pole pieces 11 and 12 are adjustably positioned with respect to each other. One manner of providing adjustable pole pieces 11 and 12 is illustrated in Figure 1 wherein the base 25 is provided with an innerleaved portion 26 which permits limited movement of the pole piece 12 toward and away from the pole piece 11.

While I have shown a particular embodiment of my invention, it will, of course, be understood that I do not want to be limited thereto, since many modifications may be made, and I, therefore, contemplate by the appended claims to cover all such modifications as fall within the true spirit and scope of my invention.

I claim as my invention:

1. A magnetizing device for transversely magnetizing a body comprising a stationary pair of magnetic poles having confronting pole faces, each of said poles having a narrow rib extending across its pole face, said ribs being angularly disposed with respect to each other and confronting the entire length and a very small portion of the width of said body.

2. A magnetizing device for transversely magnetizing a cylindrical object comprising a pair of magnetic poles having confronting pole faces, each of said poles having a narrow rib extending across its pole face, said ribs being disposed at an angle of approximately 20° with respect to each other and confronting opposite surface areas of said cylindrical object, which areas have very small widths compared to the diameter of said object.

3. A magnetizing device comprising a magnetic yoke having a pair of confronting poles, a magnetizing coil mounted on said yoke for establishing a magnetic field between said poles, said poles being arranged to hold an article to be magnetized between their confronting faces, and projecting means on said poles for causing the flux entering said article to be concentrated on opposite surface areas of said article of small width compared to the width of the article and extending along lines at a small angle with respect to the longitudinal axis of the article.

4. Apparatus for transversely magnetizing a cylindrical body along semi-circular, parallel paths, comprising an electromagnet having confronting pole faces, between which the body is adapted to be held each pole face having a linear ridge confronting and incremental surface area extending along the entire length and across a very small portion of the width of said body, said linear ridges being disposed at an acute angle with respect to the axis of said body and with respect to each other.

MORRIS L. MAGES.